United States Patent
Buehler et al.

(10) Patent No.: US 10,942,984 B2
(45) Date of Patent: *Mar. 9, 2021

(54) PORTAL CONNECTED TO A SOCIAL BACKEND

(71) Applicant: International Business Machines Corporation, Armonk, NY (US)

(72) Inventors: Dieter Buehler, Tuebingen (DE);
Matthias Falkenberg, Stuttgart (DE);
Peter Fischer, Marktrodach (DE);
Richard Jacob, Filderstadt (DE);
Stephan Laertz, Herrenberg (DE);
Simon Naegele, Schonaich (DE);
Juergen Schaeck, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/433,477

(22) Filed: Jun. 6, 2019

(65) Prior Publication Data

US 2019/0286672 A1 Sep. 19, 2019

Related U.S. Application Data

(63) Continuation of application No. 16/044,646, filed on Jul. 25, 2018, now Pat. No. 10,366,139, which is a
(Continued)

(30) Foreign Application Priority Data

Aug. 22, 2013 (GB) ...................................... 1315007

(51) Int. Cl.
*G06F 16/958* (2019.01)
*H04L 29/08* (2006.01)
(Continued)

(52) U.S. Cl.
CPC .......... *G06F 16/958* (2019.01); *G06F 16/954* (2019.01); *G06F 16/972* (2019.01); *H04L 67/1095* (2013.01); *G06Q 50/01* (2013.01)

(58) Field of Classification Search
CPC .......... G06F 17/3089; G06F 17/30897; G06F 17/30873; H04L 67/1095
See application file for complete search history.

(56) References Cited

U.S. PATENT DOCUMENTS 7,103,844 B2 9/2006 Jones
8,463,896 B2 6/2013 Breau et al.
(Continued)

FOREIGN PATENT DOCUMENTS

GB 2520668 A 10/2013

OTHER PUBLICATIONS

IBM: List of IBM Patents or Patent Applications Treated As Related (Appendix P), Nov. 7, 2019 pp. 1-2.
(Continued)

*Primary Examiner* — Nam T Tran
(74) *Attorney, Agent, or Firm* — Michael O'Keefe

(57) ABSTRACT

A portal system comprises a portal connected to at least one social backend, a portal object generator for creating a page in the portal, and a backend processing component. The portal system further performs a method comprising: integrating functionality of said at least one social backend into said portal system; implementing association information as meta data entries containing information about a social object of said at least one social backend; receiving a notification about creation of new portal objects by an integration component; creating a new instance of a social object within said at least one social backend by said integration component; receiving a new identification from a newly created social object by said integration component;
(Continued)

inserting new social object identification into meta data of said newly created social object; and representing said social object as a portal object to a portal user.

19 Claims, 7 Drawing Sheets

Related U.S. Application Data continuation of application No. 14/462,165, filed on Aug. 18, 2014, now Pat. No. 10,133,825.

(51) Int. Cl.
*G06F 16/954* (2019.01)
*G06Q 50/00* (2012.01)

(56) References Cited

U.S. PATENT DOCUMENTS

| | | |
|---|---|---|
| 8,892,987 B2 | 11/2014 | Leebow |
| 10,021,201 B1 | 7/2018 | Berentey et al. |
| 10,133,825 B2 | 11/2018 | Buehler |
| 10,366,139 B2 | 7/2019 | Buehler |
| 2004/0104931 A1 | 6/2004 | Schmitt |
| 2006/0004853 A1 | 1/2006 | Danninger |
| 2011/0125924 A1 | 5/2011 | McAleer |
| 2011/0131501 A1 | 6/2011 | Lauridsen |
| 2011/0282943 A1 | 11/2011 | Anderson |
| 2012/0144317 A1 | 6/2012 | Balasubramanian |
| 2013/0239012 A1 | 9/2013 | Barak |
| 2018/0329920 A1 | 11/2018 | Buehler |

OTHER PUBLICATIONS

UK Intellectual Property Office, Examination Opinion for GB Application No. 1315007.3, dated Jan. 21, 2014.
IBM: List of IBM Patents or Patent Applications Treated As Related (Appendix P), Jul. 14, 2020, pp. 1-2.

PORTAL CONNECTED TO A SOCIAL BACKEND

BACKGROUND

The present invention relates in general to the field of web portals, and in particular to a portal environment and a method for operating a portal environment. Still more particularly, the present invention relates to a data processing program and a computer program product for operating a portal environment.

Web Portals allow providing a role specific personalized view on applications and web contents of an enterprise by end users via a single-entry point. Applications and information coming from multiple sources are aggregated into a portal page that serves a specific business need helping site visitors, customers or employees to get to their individual goals more efficiently. This could mean, for example, for an employee to get the individual job tasks done more quickly and do faster and better decisions because all relevant information and applications are immediately at hand on the corresponding portal page, or for a site visitor to find target information and application for her or his specific user profile. In those portal systems, the portal page is typically assembled by page editors putting the right set of application components, typically portlets, and the right set of accompanying web content onto those pages and then exposing those pages to individual user roles as needed. The web content in turn, is typically created by content authors using a web content management system that provides the means to efficiently create web content supporting concepts like workflow based approval processes for new content, previewing of new draft content, versioning, reusable design components to support consistent look and feel, targeting of the right content to the right user profiles, archiving and syndicating newly created or modified content from an authoring system to individual delivery systems.

On the other hand, there is a trend in information technology (IT) towards social aspects of user interaction that are even more dynamic than what web portals provide today. So, new communities are created by end-users, permanently modified, and deleted again, representing dynamic teams, or interest groups. These communities share information for example via wikis, blogs, or files organized in folders that are created, modified and removed again depending on the current demand. Furthermore, any such social artifact can be tagged and/or rated by anyone to make it easy for anybody to find it based on the individual interest or need. In summary portals are not sufficiently integrated with social backends or networks to be able to reflect the volatile character of today user interaction.

FIG. 1 and FIG. 2 show a conceptual prior art portal environment 1, and FIG. 3 shows a component interaction flow, in the prior art portal environment 1 to create a new portal page. In the portal environment 1 new portal artifacts can be add by instantiating page templates and/or portlets that are associated with specific applications or content. Furthermore, the instantiation of portal artifacts can even trigger the creation of new portal web content as depicted in FIG. 3.

Referring to FIG. 1 and FIG. 2, a prior art portal environment 1 comprises a portal 10 used by a client 3 and connected to at least one backend 40 providing external web site data 42. To run at least one portal application the portal 10 comprises a page model component 12 comprising page models edited by a page editor 5, a portlet model component 14 comprising portlet models developed by a portlet developer 7, a templating component 15, a web content manager 16 used by content authors 8 and site designers 9 to create and update web content to be used, and a portal access control component 18. The page model component 12 and the portlet model component 14 are connected to a portal data base 20 storing different page models and portlet models. The web content manager 16 is connected to a web content database 30 and comprises a web content rendering engine capable of transforming a given content item into markup that can be rendered by the client 3.

Referring to FIGS. 1-3, in prior art, the integration of data from external web sites 42 of at least one external backend 40 is done using dedicated integration portlets of the portlet model component 14 that retrieve feed driven information, e.g. lists of social data like blog entries, list of shred bookmarks, etc., from a separate external web site 42, and generate according markup to be added as markup fragment to the overall page.

In this approach, a page editor 5 can add external capabilities to a portal page by putting a right integration portlet onto the page, such that the appropriate feed driven information gets added to the page. The corresponding conceptual component interaction flow between the client 3 and the web content manager 16 is depicted in FIG. 3.

Referring to FIG. 3, in a first step the client 3 creates a portal object, e.g. a page, from a template in the portal environment 1 by calling the corresponding model controller application programming interfaces (APIs) of the portal model component 12 or the portlet model component 14 that handle the page instantiation in the portal 10. The page model component 12 and/or the portlet model component 14 load a corresponding page template from the portal data base 20. The templating component 15 of the portal 10 listens for events triggered by the page creation process and retrieves mapped data of corresponding site areas. Further, the templating component 15 copies a corresponding site area from the web content manager 16 and sets a corresponding site area owner. Further, the templating component 15 maps the new side area data in the portal data base 20 and transmits the new page to the portal model component 12 or the portlet model component 14 portal application, which present the new page to a web browser of the client 3.

The fundamental problem with prior art solutions is the static nature of the integration. If a specific portlet displays the content of a given blog entry and this blog entry gets removed the portlet is broken and requires manual maintenance by either changing its configuration to get the content of a different blog entry or by removing the portlet.

Also new content is not easy to integrate. If there is a new interesting blog entry available on the backend a new portlet must be added to the portal and configured to get the content of the new blog entry.

This setup requires either interaction of an administrator with the rights to add, remove and configure portlets or to give corresponding access to the end users resulting either in even longer delays or a lack of security. Independent from that the prior art solution can also easily lead to an outdated and incomplete representation of the data to be integrated.

SUMMARY

In one embodiment of the present invention, a portal system comprises: a portal connected to at least one social backend, where said at least one social backend supports a social media service for a user of the portal; a portal object generator for creating a page in the portal, where creating the page in the portal changes a portal model of the portal; and a backend processing component for keeping the portal synchronized with said at least one social backend in response to changes in the portal, where the changes in the portal comprise at least one of a group consisting of: creation of a new page, deletion of an existing page, modification of an existing page, creation of a new portlet, and deletion of an existing portlet, where said portal comprises an integration component communicating with said at least one social backend. The portal system further performs a method comprising: integrating functionality of said at least one social backend into said portal system by creating at least one portal object that is associated with at least one social object, where a representative social object is created in response to a web content item with social content being created, where content is retrieved from a web content manager in response to said web content item with social content being enriched with associated information, and where said associated information comprises access statistics; implementing said association information as meta data entries containing information about a social object of said at least one social backend; receiving a notification about creation of new portal objects by said integration component; creating a new instance of a social object within said social backend by said integration component; receiving a new identification from a newly created social object by said integration component; inserting new social object identification into meta data of said newly created social object; and representing said social object as a portal object to a portal user, where said representing reflects deletion and updates of portal objects in said at least one social backend.

In one embodiment of the present invention, a method and/or computer program product connects a portal to at least one social backend, where said at least one social backend supports a social media service for a user of the portal. A page in the portal is created, where creating the page in the portal changes a portal model of the portal. The portal is synchronized with said at least one social backend in response to changes in the portal, where the changes in the portal comprise at least one of a group consisting of: creation of a new page, deletion of an existing page, modification of an existing page, creation of a new portlet, and deletion of an existing portlet, where said portal comprises an integration component communicating with said at least one social backend. The functionality of said at least one social backend is integrated into said portal system by creating at least one portal object that is associated with at least one social object, where a representative social object is created in response to a web content item with social content being created, where content is retrieved from a web content manager in response to said web content item with social content being enriched with associated information, and where said associated information comprises access statistics. One or more processors then implement said association information as meta data entries containing information about a social object of said at least one social backend; receive a notification about creation of new portal objects by said integration component; create a new instance of a social object within said social backend by said integration component; receive a new identification from a newly created social object by said integration component; insert new social object identification into meta data of said newly created social object; and represent said newly created social object as a portal object to a portal user, where said representing reflects deletion and updates of portal objects in said at least one social backend.

BRIEF DESCRIPTION OF THE DRAWINGS

A preferred embodiment of the present invention, as described in detail below, is shown in the drawings, in which.

DETAILED DESCRIPTION

Figure 1:
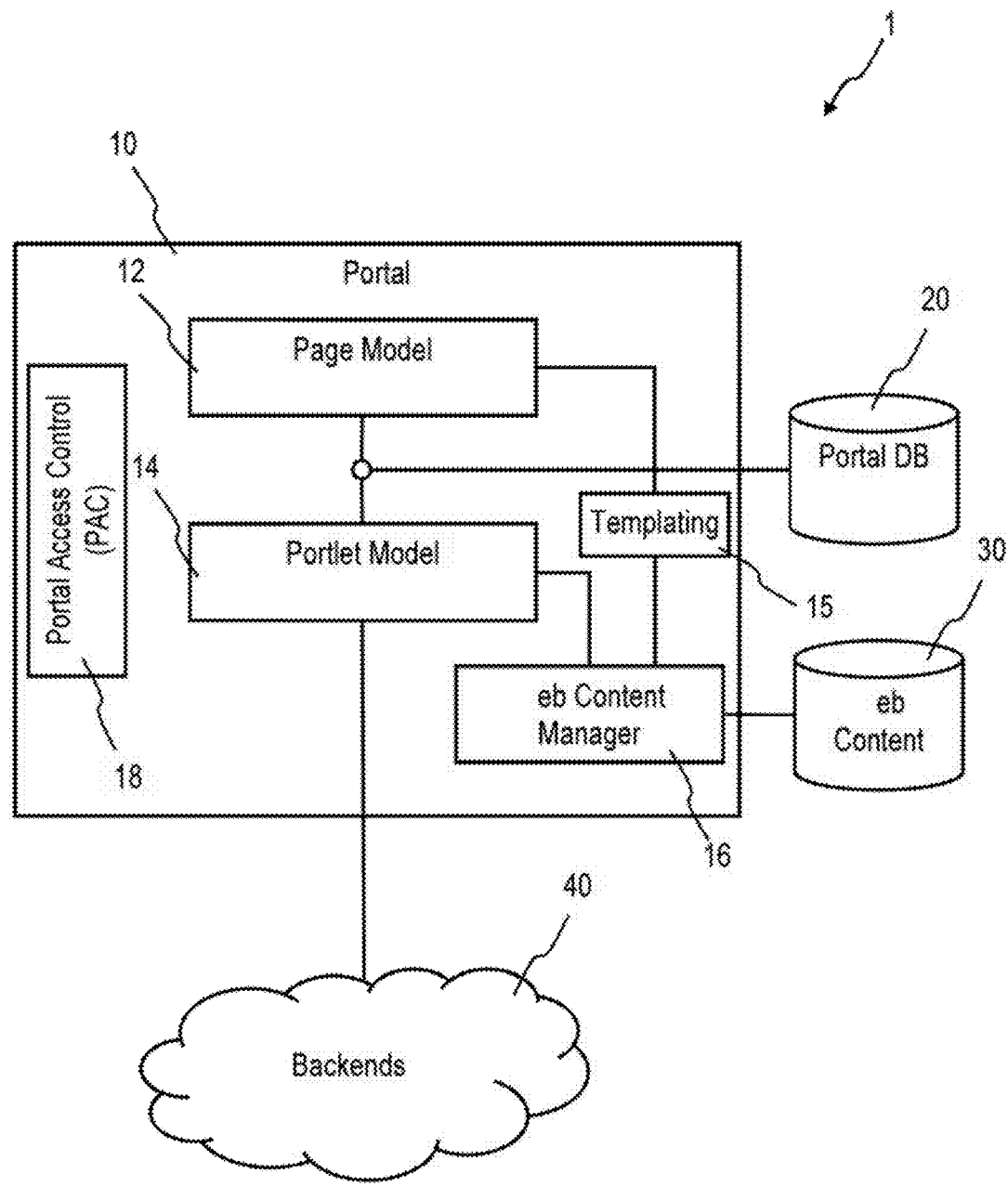
FIG. 1 is a schematic block diagram of a prior art portal environment.
Figure 2:
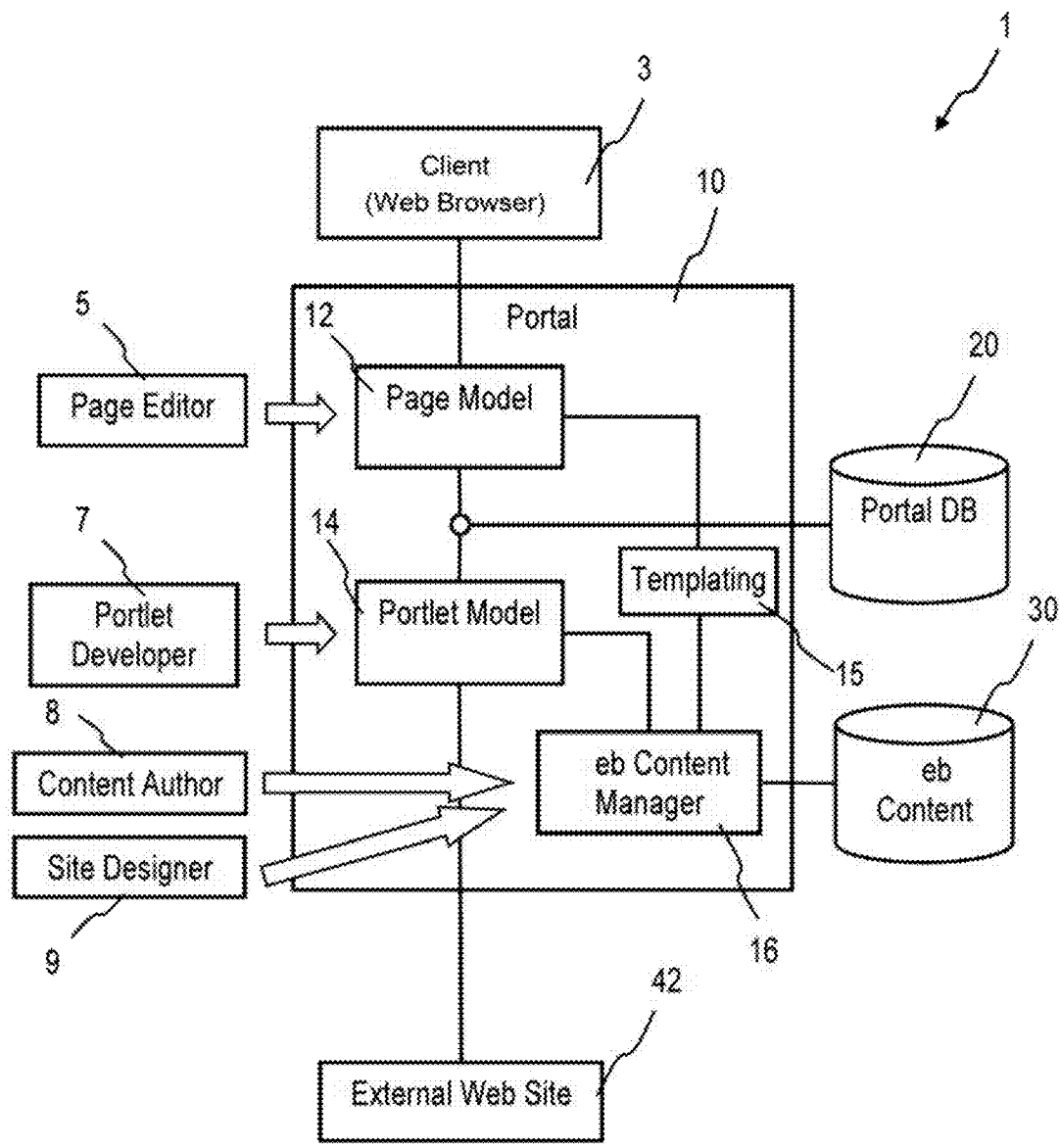
FIG. 2 is a schematic block diagram of the prior art portal environment of FIG. 1 in greater detail.
Figure 3:
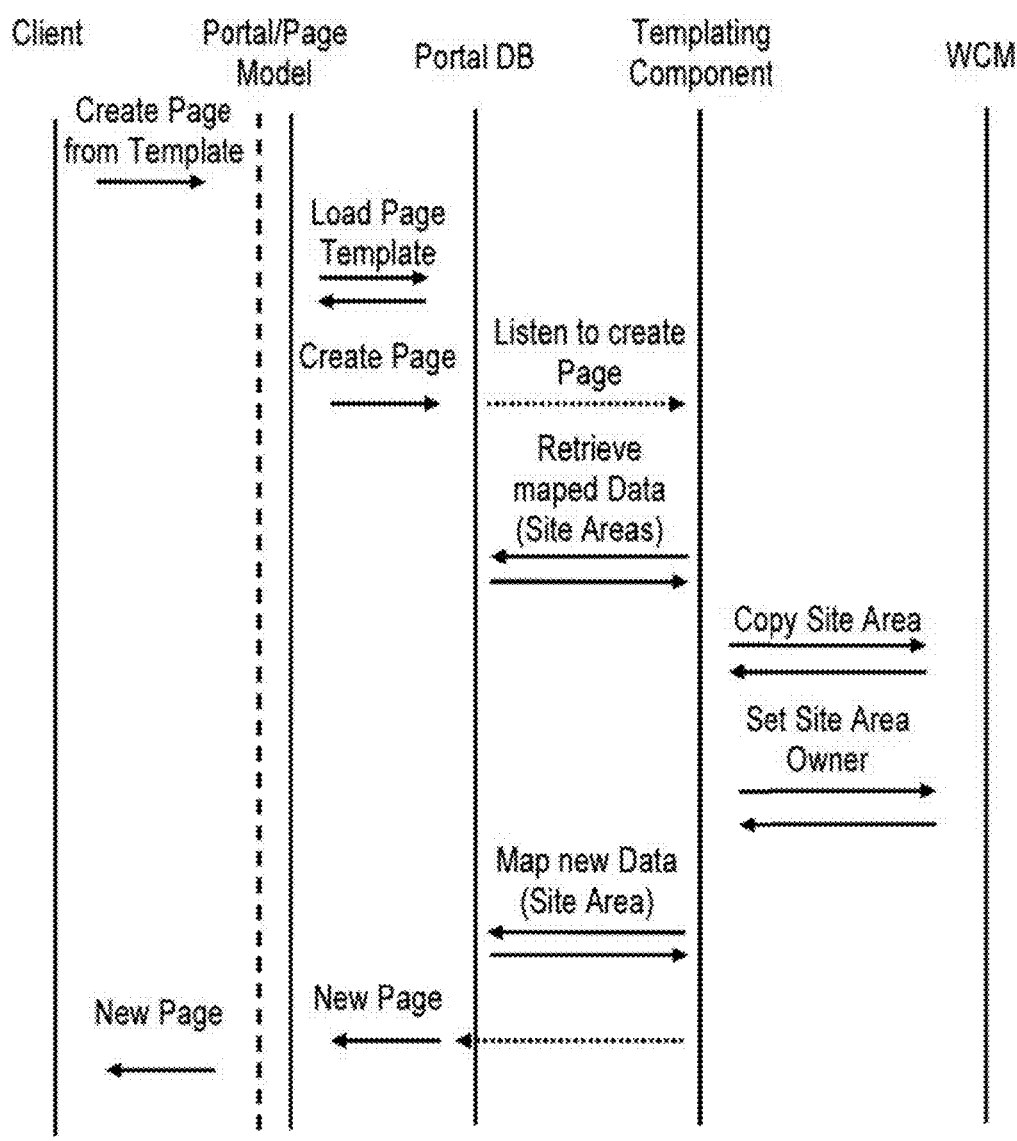
FIG. 3 is a conceptual representation of a component interaction flow, in accordance with an embodiment of the prior art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
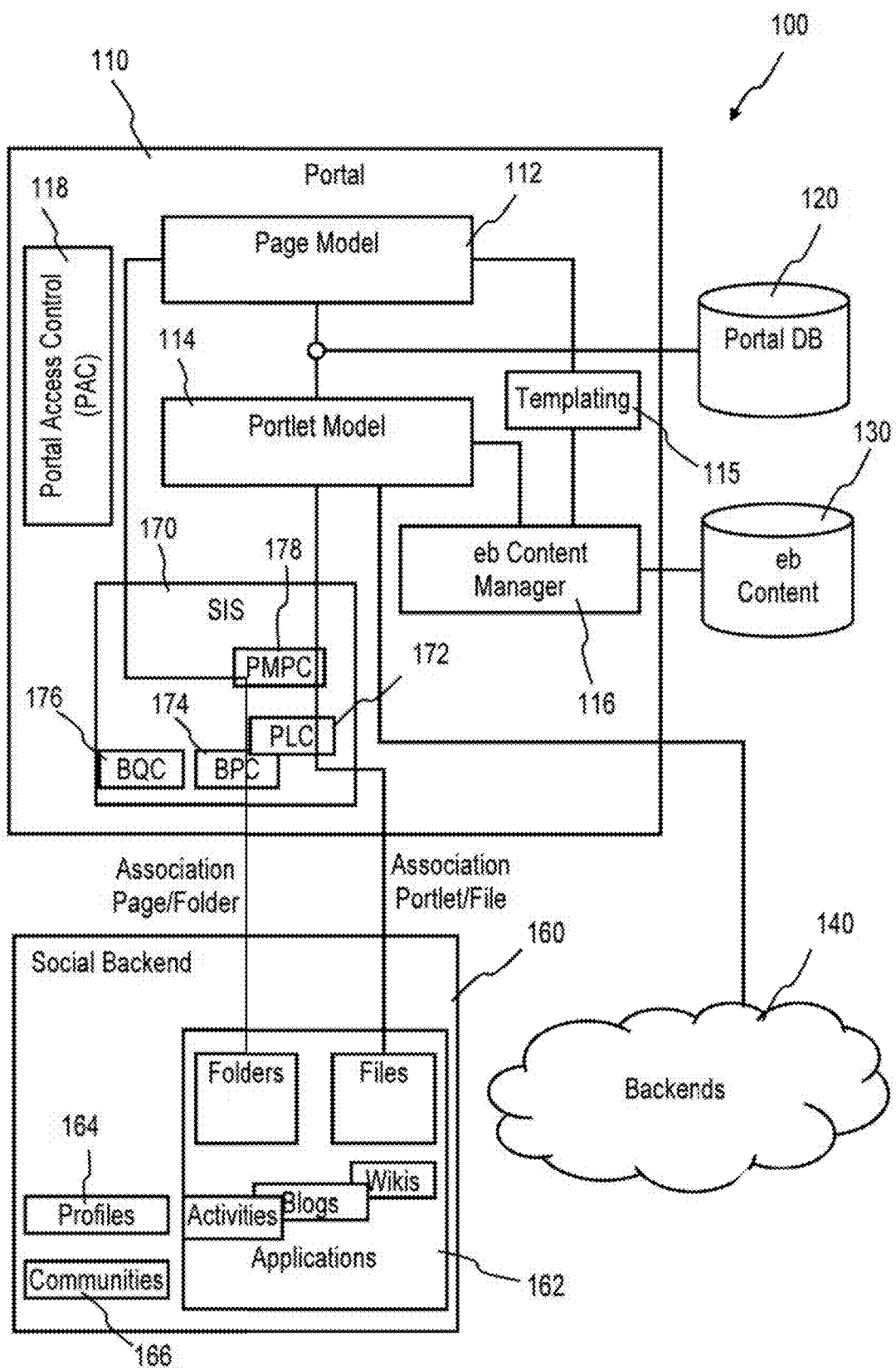
FIG. 4 is a schematic block diagram of a portal environment, in accordance with an embodiment of the present invention.
Figure 5:
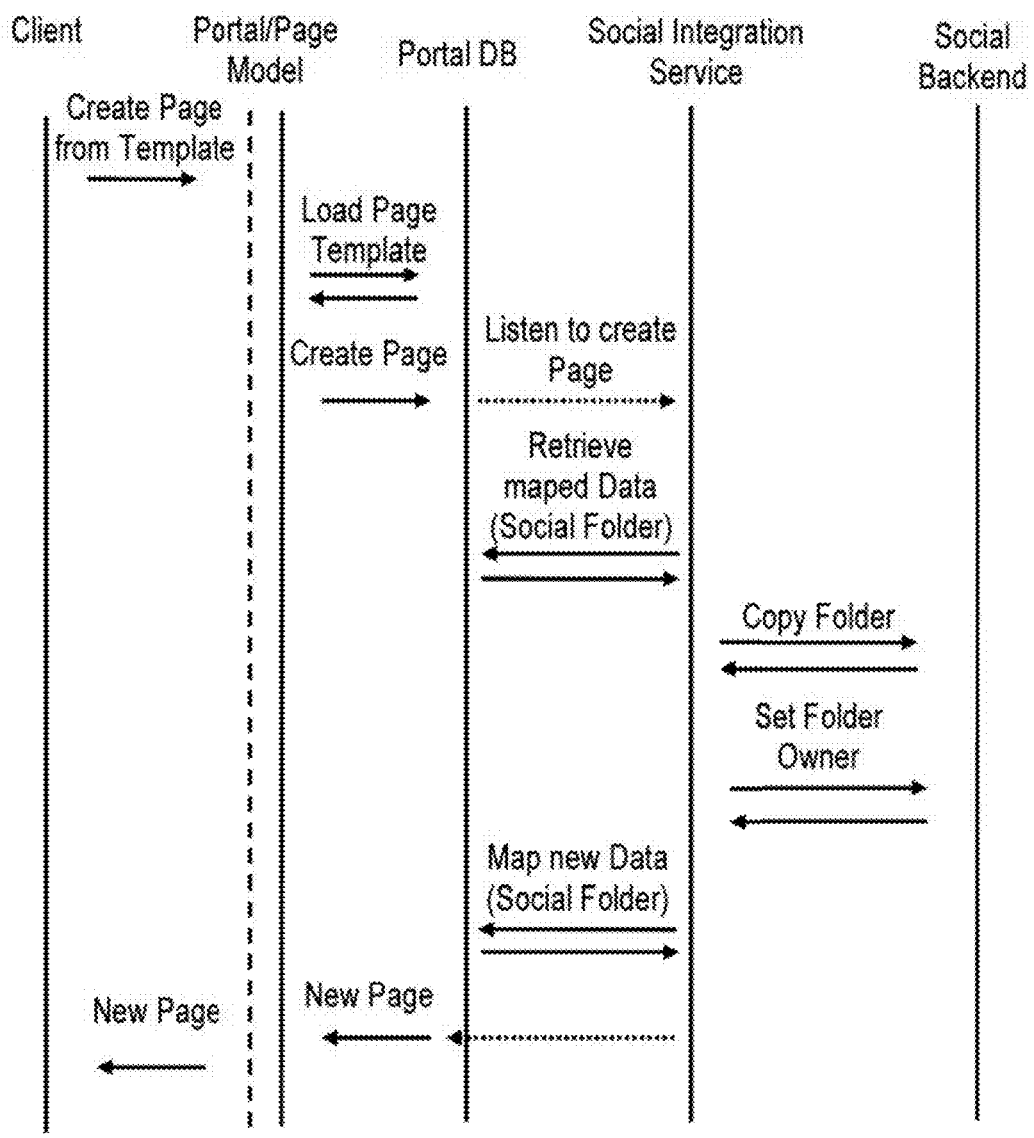
FIG. 5 is a conceptual representation of a component interaction flow to instantiate a social page, in accordance with an embodiment of the present invention.
Figure 6:
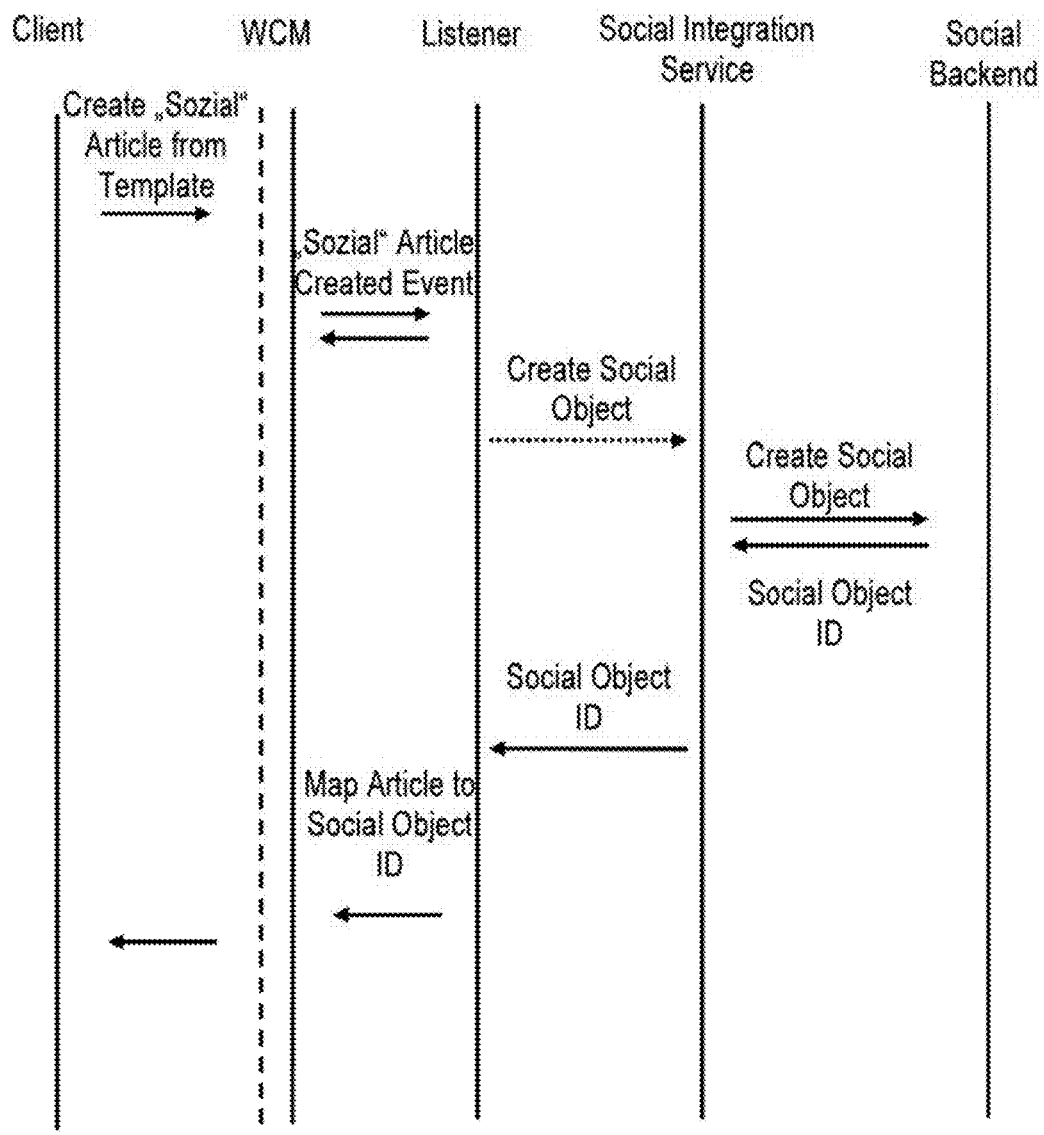
FIG. 6 is a conceptual representation of a component interaction flow to instantiate a social content item, in accordance with an embodiment of the present invention.
Figure 7:
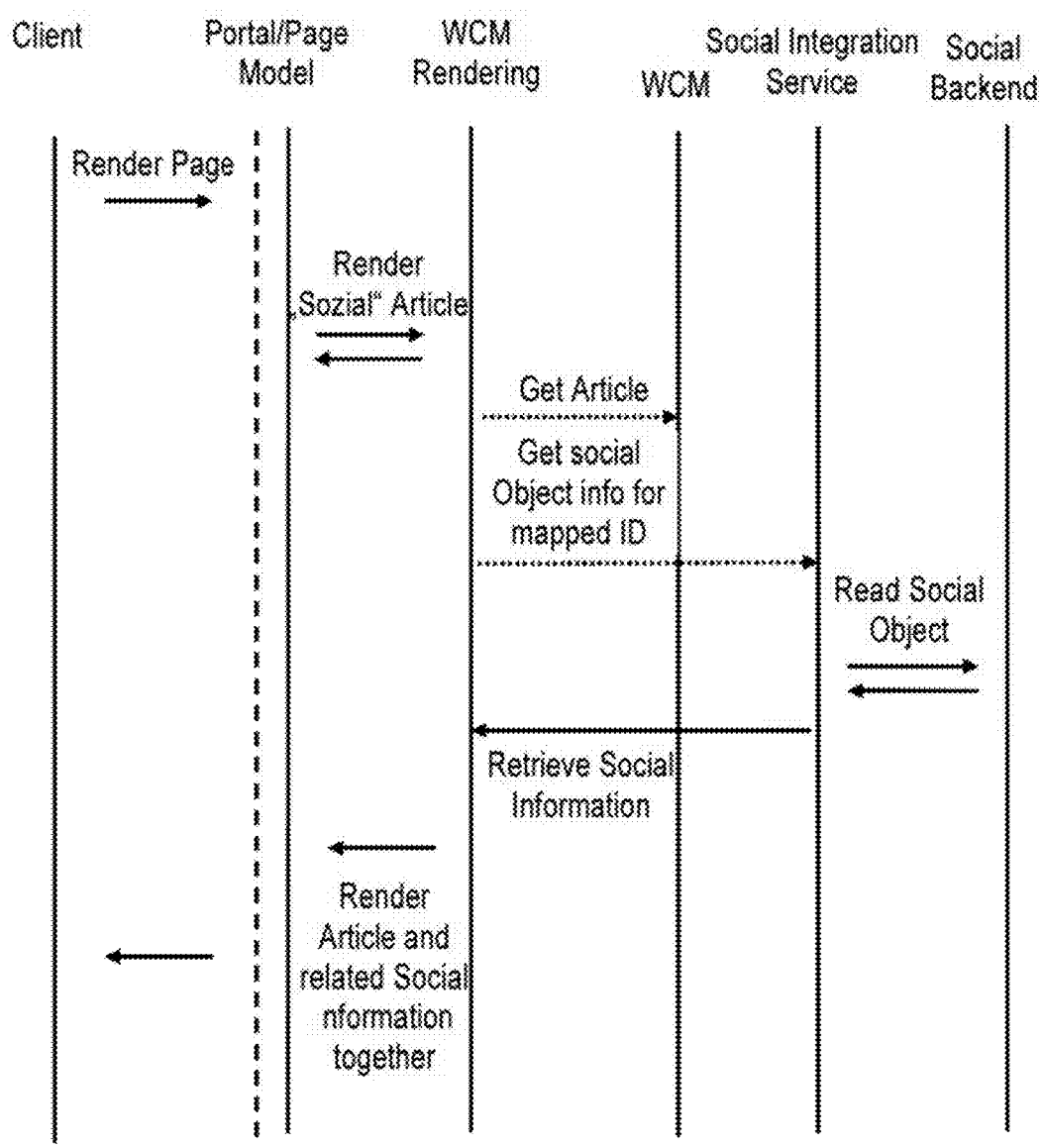
FIG. 7 is a conceptual representation of a component interaction flow to render a social content item, in accordance with an embodiment of the present invention.

FIG. 4 shows a portal environment, in accordance with an embodiment of the present invention; FIG. 5 shows a component interaction flow to instantiate a social page, in accordance with an embodiment of the present invention; FIG. 6 shows a component interaction flow to instantiate a social content item, in accordance with an embodiment of the present invention; and FIG. 7 shows a component interaction flow to render a social content item, in accordance with an embodiment of the present invention.

Referring to FIG. 4, the shown embodiment of the present invention employs a portal environment 100 comprising a portal 110 connected to at least one social backend 160 and to conventional backends 140. The portal 110 comprises an integration component 170 communicating with the at least one social backend 160; wherein functionality of the at least one social backend 160 is integrated into the portal environment 100 by creating at least one portal object that is associated with at least one social object. The integration component 170 comprises a portal listening component 172 listening events triggered by running applications of the portal 110 and creating an event list by filtering the events for events associated with the at least one social backend 160; a backend processing component 174 keeping the portal applications in synchronization with the at least one social backend 160 regarding changes on portal side; a backend query component 176 querying application programming interfaces of the at least one social backend 160 for current social objects and their states, a portal model processing component 178 calculating actions based on passed in states of current social objects from the backend query component 176 and invoking corresponding application programming interface calls on the portal 110.

Further the backend processing component 174 calculates actions based on the event list and invokes corresponding application programming interface calls on the social backend 160 for synchronization of the portal applications and the at least one social backend 160.

Still referring to FIG. 4, the page model component 112 and the portlet model component 114 are connected to a portal data base 120 storing different page models and portlet models, and the web content manager 116 is connected to a web content database 130 and comprises a web content rendering engine capable of transforming a given content item into markup that can be rendered by the client 3. Further the page model component 112 is connected to the web content manager 116 via a templating component 115.

In the shown embodiment the portal listening component (PLC) 172 listens for events triggered by the portal application for example during the creation of a new page, the deletion or modification of an existing page, the creation of a new portlet or the deletion or modification of an existing portlet. The portal listening component (PLC) 172 only starts an action for portal events that are related to portal artifacts that are associated with a social backend 160, e.g. via uniform resource locators (URLs) pointing to a social backend 160 stored in an attribute or property of the portal artifact referenced by the event.

The backend processing component (BPC) 174 calculates the required actions based on passed in events from the portal listening component (PLC) 172 and invokes the corresponding application programming interface (API) calls on the social backend 160 thus keeping the portal application and the social backend 160 in synchronization regarding changes on the portal side.

The backend query component (BQC) 176 queries the social backend 160 via its application programming interfaces (APIs) for the current social objects like applications 162, profiles 164, communities 166, and corresponding activities, blogs, wikis, folders, files, etc., and their states.

The portal model processing component (PMPC) 178 calculates required actions based on passed in states from the backend query component (BQC) 176 and invokes the corresponding application programming interface (API) calls on the portal model. E.g. for newly created social objects it invokes the portal model application programming interfaces (APIs) to add a page to the page hierarchy and page navigation or to add portlet objects to the correct pages. This applies accordingly to the deletion and modification of pages and portlets if corresponding objects have been deleted or modified in the social backend 160.

If during the traversal of the page hierarchy, for example when the portal's page navigation is created, a page is accessed that is associated with a social object, like a social folder, the social integration service (SIS) 170 fills the page and portlet model based on queries made against the social backend 160. That way the portal 110 contains volatile social artifacts represented as portal artifacts.

To trigger the creation or deletion of social objects in the social backends 160 whenever corresponding portal artifacts are created or deleted the social integration service (SIS) 170 listens to corresponding events of the portal model APIs and performs the required calls to the social backend 160. Thus, no other portal components need to be changed.

Referring to FIG. 5, a portal object, for example a page, gets created in the portal environment 100. This task is performed by calling the corresponding model controller application programming interfaces (APIs) of the page model component 112 or the portlet model component 114 that handle the page instantiation in the portal 110. This creation step means a change to the portal's model. Also, this new page in this example is based on a page template that is associated with a social object, wherein said association is implemented by meta data entries, e.g. attributes or properties of a page, containing information about the social backend 160, e.g. via a uniform resource locators (URL), and the social object, e.g. an identifier string that is valid within the social backend 160. This modification of the portal model triggers a corresponding event about the creation of the new portal page that is, amongst others, received by the portal listening component (PLC) 172 of the social integration service 170 that then invokes the backend processing component (BPC) 174. The backend processing component (BPC) 174—based on this data—creates a new instance of said social object using the current user as owner of this object within said social backend 160 by calling the corresponding backend application programming interfaces (APIs). The backend processing component (BPC) 174 receives a new identification (ID) from the newly created social object inserting new social object identification (ID) into the Meta data of the newly created portal page. So, the social object is represented as a portal artifact to portal users.

The deletion and updates of portlet objects are reflected in the social backend 160 by the social integration service (SIS) 170 as well.

Also the social integration service (SIS) 170 keeps the portal model up to date if objects on the social backend 160 are created, modified or deleted.

The method comprises the steps of opening a portal object in the portal environment 100, for example a page, by a user. This task is performed by calling the corresponding model application programming interfaces (APIs) that are used to render the pages and their sub-components, e.g. portlets, in the portal 110. When rendering a page associated with a social backend object, the backend query component (BQC) 176 of the social integration service (SIS's) 170 checks if the object associated with the page still exists in the backend 160, and gathers the list of nested objects, e.g. if the page is associated with a blog, the list of corresponding blog entries is retrieved, to pass it on to the portal model processing component (PMPC) 178. If the object associated with the page does not exist anymore, the page is removed from the model. The portal model processing component (PMPC) 178 uses this list to create additional portal artifacts as required, for example it makes sure that each blog entry is represented by a portlet in the model pointing to the blog entry. Additional portlets that are associated with blog entries that got removed in the meantime are also removed. According to this, the social object is presented as a portal artifact to portal users.

Referring to FIG. 6, a new article is created in the portal 110. As for prior art portals the article is represented as a web content item that still gets created first. But now the social integration service (SIS) 170 also creates the corresponding item, in this case a topic in a forum, in the social backend 160 and associates the new topic with the new article so that these two items can be rendered together as depicted in FIG. 6.

Referring to FIG. 7, a user navigates to a page displaying the article web content item that is associated with the forum topic. As for prior art portals the content item is retrieved from the web content management (WCM) component 116 but before it gets rendered the social integration service (SIS) 170 also retrieves the content and meta data for the associated forum topic from the social backend 160. Depending on the rendering template the article's content is supplemented with social data like the number of comments, information about who liked this article, etc.

In summary, a method for operating a portal environment comprising a portal 110 connected to at least one social backend 160, wherein the portal 110 comprises an integration component 170 communicating with the at least one social backend (160), comprises the steps of: Integrating functionality of the at least one social backend 160 into the portal environment 100 by creating at least one portal object that is associated with at least one social object; implementing the association by meta data entries containing information about said at least one social backend 160 and/or a social object 162, 164, 166 of said at least one social backend 160; receiving a notification about creation of new portal object by the integration component 170, creating a new instance of the social object within the social backend 160 by the integration component 170, receiving a new identification from the newly created social object by the integration component 170, inserting new social object identification into the meta data of the newly created portal object, and representing the social object as portal object to portal user, wherein said integration component 170 reflects deletion and updates of portal objects in the social backend 160.

Further a folder of the at least one social backend 160 is associated to a page on the portal 110 and/or a file of the at least one social backend 16) is associated to a portlet on the portal 110 and/or a forum topic of the at least one social backend 160 is associated to a web content on the portal 110.

An improved portal environment 100 comprises a portal 110 connected to at least one social backend 160, wherein the portal 110 comprises an integration component 170 communicating with the at least one social backend 160; wherein functionality of the at least one social backend 160 is integrated into the portal environment 100 by creating at least one portal object that is associated with at least one social object; wherein the integration component 170 comprises a portal listening component 172 listening to events triggered by running applications of the portal 110 and creating an event list by filtering the events for events associated with the at least one social backend 160; a backend processing component 174 keeping the portal applications in synchronization with the at least one social backend 160 regarding changes on portal side; a backend query component 176 querying application programming interfaces of the at least one social backend 160 for current social objects and their states, a portal model processing component 178 calculating actions based on passed in states of current social objects from the backend query component 176 and invoking corresponding application programming interface calls on the portal 110.

The technical problem underlying the present invention is to provide a portal environment and a corresponding method for operating a portal environment, which are able to integrate external content feed data, especially external social backend data to a portal page, and to solve the above-mentioned shortcomings and pain points of prior art portal environments.

Accordingly, in an embodiment of the present invention a portal environment comprises a portal connected to at least one social backend. The portal comprises an integration component communicating with the at least one social backend, wherein functionality of the at least one social backend is integrated into the portal environment by creating at least one portal object that is associated with at least one social object. The integration component comprises a portal listening component listening events triggered by running applications of the portal and creating an event list by filtering the events for events associated with the at least one social backend; a backend processing component keeping the portal applications in synchronization with the at least one social backend regarding changes on portal side; a backend query component querying application programming interfaces of the at least one social backend for current social objects and their states, a portal model processing component calculating actions based on passed in states of current social objects from the backend query component and invoking corresponding application programming interface calls on the portal.

In further embodiments of the present invention, the backend processing component calculates actions based on the event list and invokes corresponding application programming interface calls on the social backend for synchronization of the portal applications and the at least one social backend.

In further embodiments of the present invention, the listening events triggered by running applications of the portal comprise at least one of the following processes: Creation of a new page, deletion or modification of an existing page, creation of a new portlet or deletion or modification of an existing portlet.

In further embodiments of the present invention, each portal event of the event list comprises at least one uniform resource locator pointing to the social backend stored in an attribute or property of a portal object referenced by a corresponding portal event.

In further embodiments of the present invention, the integration component fills a page and portlet model based on queries made against the social backend if a corresponding page associated with a social object is accessed during traversal of page hierarchy.

In further embodiments of the present invention, the integration component triggers a creation or deletion of social objects in the social backend whenever corresponding portal objects are created or deleted.

In another embodiment of the present invention, a method for operating a portal environment comprising a portal connected to at least one social backend, wherein the portal comprises an integration component communicating with the at least one social backend, comprises the steps of: Integrating functionality of the at least one social backend into the portal environment by creating at least one portal object that is associated with at least one social object; implementing the association by meta data entries containing information about the at least one social backend and/or a social object of the at least one social backend; receiving a notification about creation of new portal object by the integration component, creating a new instance of the social object within the social backend by the integration component, receiving a new identification from the newly created social object by the integration component, inserting new social object identification into the meta data of the newly created portal object, representing the social object as portal object to portal user, wherein the integration component reflects deletion and updates of portal objects in the social backend.

In further embodiments of the present invention, a folder of the at least one social backend is associated to a page on the portal and/or a file of the at least one social backend is associated to a portlet on the portal and/or a forum topic of the at least one social backend is associated to a web content on said portal.

In further embodiments of the present invention, page hierarchy and page content depend on content of a corresponding application of the at least one social backend.

In further embodiments of the present invention, an entry in a social blog application is represented by a portlet on a corresponding page.

In further embodiments of the present invention, another blog related to the social blog application is represented as child or sibling page of said portal.

In further embodiments of the present invention, representative social object is created when a web content item with social content is created, wherein content is retrieved form a web content manager when the web content item with social content is rendered enriched with associated information.

In further embodiments of the present invention, the associated information comprises at least one of the following: Social data, like tags, number of likes or access statistics.

In another embodiment of the present invention, a data processing program for execution in a data processing system comprises software code portions for performing a method for operating a portal environment when the program is run on the data processing system.

In yet another embodiment of the present invention, a computer program product stored on a computer-usable medium, comprises computer-readable program means for causing a computer to perform a method for operating a portal environment when the program is run on the computer.

All in all, embodiments of the present invention are able to enhance the performance of portal environments and bring forward social concepts to portals and thus enable dynamic adaptation to volatile user interaction scenarios in today's industry projects accessible via a single entry point to the information technology (IT) infrastructure of a corresponding enterprise.

The key idea of the present invention is to integrate the social backend data by associating different portal artifacts, like pages, portlets, content items, etc., with different social objects so that changes to the backend can be reflected automatically in the portal environment, instead of managing single portlets manually.

One possible implementation to integrate the social backend data is to associate a portal page with a folder of a social backend application. The page hierarchy and their content are not statically defined but depending on the content of a social blog application.

For example, all entries in the blog are represented by a portlet on that page while other related blogs are represented as child or sibling pages. Each portlet on such a page shows the content of a blog entry. Whenever a blog gets created in the backend a corresponding page will be added to the hierarchy of the portal page and whenever a blog entry gets created in the backend a corresponding portlet gets created on the portal page representing the blog.

On the other hand, the creation or deletion of a portal page in that sub-tree triggers the creation or deletion of the associated blog in the social backend application and the creation or deletion of a portlet on such a portal page triggers the creation or deletion of a blog entry in the social backend application.

Another possible implementation to integrate the social backend data is to associate web content items with social data. When a "social" content item is created, a representative social object is created as well. Users can perform social actions on that item like commenting or liking. When the "social" content item is rendered, the content is retrieved from the web content management backend, as for prior art content item, but enriched with associated social data, like tags, number of likes, access statistics, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A portal system comprising:
a portal connected to at least one social backend, wherein said at least one social backend supports a social media service for a user of the portal;
a portal object generator for creating a page in the portal, wherein creating the page in the portal changes a portal model of the portal; and
a backend processing component for keeping the portal synchronized with said at least one social backend in response to changes in the portal, wherein said portal comprises an integration component communicating with said at least one social backend, the portal system further performing a method comprising:
integrating functionality of said at least one social backend into said portal system by creating at least one portal object that is associated with at least one social object, wherein a representative social object is created in response to a web content item with social content being created, wherein content is retrieved from a web content manager in response to said web content item with social content being enriched with associated information, and wherein said associated information comprises access statistics;
implementing said association information as meta data entries containing information about a social object of said at least one social backend;
creating a new instance of a social object within said social backend by said integration component;
inserting new social object identification into meta data of said newly created social object; and
representing said social object as a portal object to a portal user, wherein said representing reflects deletion and updates of portal objects in said at least one social backend.

2. The portal system according to claim 1, wherein each portal event of an event list comprises at least one uniform resource locator pointing to said at least one social backend stored in an attribute of a portal object referenced by a corresponding portal event.

3. The portal system according to claim 1, further comprising:
an integration component that fills a page model and a portlet model based on queries made against said at least one social backend in response to a corresponding page associated with a social object being accessed during traversal of page hierarchy.

4. The portal system according to claim 1, further comprising:
an integration component that triggers a creation or deletion of social objects in said at least one social backend whenever corresponding portal objects are created or deleted.

5. A method comprising:
connecting, by one or more processors, a portal to at least one social backend, wherein said at least one social backend supports a social media service for a user of the portal;
creating a page in the portal, wherein creating the page in the portal changes a portal model of the portal;
synchronizing the portal with said at least one social backend in response to changes in the portal, wherein said portal comprises an integration component communicating with said at least one social backend;

integrating functionality of said at least one social backend into said portal system by creating at least one portal object that is associated with at least one social object, wherein a representative social object is created in response to a web content item with social content being created, wherein content is retrieved from a web content manager in response to said web content item with social content being enriched with associated information, and wherein said associated information comprises access statistics;

implementing said association information as meta data entries containing information about a social object of said at least one social backend;

creating a new instance of a social object within said social backend by said integration component;

inserting new social object identification into meta data of said newly created social object; and representing said newly created social object as a portal object to a portal user, wherein said representing reflects deletion and updates of portal objects in said at least one social backend.

6. The method according to claim 5, wherein a folder of said at least one social backend is associated to a page on said portal, wherein a file of said at least one social backend is associated to a portlet on said portal, and wherein a forum topic of said at least one social backend is associated to a web content on said portal.

7. The method according to claim 5, wherein page hierarchy and page content depend on content of a corresponding application of said at least one social backend.

8. The method according to claim 5, wherein an entry in a social blog application is represented by a portlet on a corresponding page.

9. The method according to claim 8, wherein another blog related to said social blog application is represented as a child page of said portal in order to define the page hierarchy.

10. The method according to claim 8, wherein another blog related to said social blog application is represented as a sibling page of said portal.

11. The method according to claim 5, wherein a representative social object is created in response to a web content item with social content being created, wherein content is retrieved from a web content manager in response to said web content item with social content being enriched with associated information, and wherein said associated information comprises social data, "like" tags, a number of "likes", and access statistics.

12. The method according to claim 5, wherein the page is associated with a web log (blog) that is supported by said at least one social backend, and wherein each entry in the blog is represented by a different portlet in the portal model.

13. The method according to claim 5, further comprising:
detecting, by one or more processors, a new article in the portal, wherein the new article is a written document about a particular topic;
creating, by one or more processors, a new topic in a forum in said at least one social backend, wherein the new topic in the forum describes the particular topic of the new article; and
rendering, by one or more processors, the forum with the new topic and the new article together in the portal.

14. The method according to claim 5, further comprising:
synchronizing, by one or more processors, the portal with applications used by said at least one social backend, profiles of individual users of said at least one social backend, and communities of users of said at least one social backend, wherein said synchronizing the portal causes the portal to contain the applications, profiles, and communities found in said at least one social backend.

15. The method according to claim 5, further comprising:
triggering, by one or more processors, said synchronization in response to the portal model of the portal being changed by the page being created in the portal.

16. The method according to claim 5, further comprising:
detecting, by one or more processors, a creation of a portal artifact in the portal by detecting a corresponding artifact creation event in a portal model application programming interface (API); and
in response to detecting the creation of the portal artifact in the portal, creating, by one or more processors, a corresponding social object in the at least one social backend.

17. The method according to claim 5, further comprising:
detecting, by one or more processors, a deletion of a portal artifact in the portal by detecting a corresponding artifact deletion event in a portal model application programming interface (API); and
in response to detecting the deletion of the portal artifact in the portal, deleting, by one or more processors, a corresponding social object in the at least one social backend.

18. A computer program product for operating a portal, the computer program product comprising a computer readable storage medium having program code embodied therewith, wherein the computer readable storage medium is not a transitory signal per se, and wherein the program code is readable and executable by a processor to perform a method comprising:

connecting a portal to at least one social backend, wherein said at least one social backend supports a social media service for a user of the portal;

creating a page in the portal, wherein creating the page in the portal changes a portal model of the portal;

synchronizing the portal with said at least one social backend in response to changes in the portal, wherein said portal comprises an integration component communicating with said at least one social backend, the method further comprising:

integrating functionality of said at least one social backend into said portal system by creating at least one portal object that is associated with at least one social object, wherein a representative social object is created in response to a web content item with social content being created, wherein content is retrieved from a web content manager in response to said web content item with social content being enriched with associated information, and wherein said associated information comprises access statistics;

implementing said association information as meta data entries containing information about said at least one social backend and a social object of said at least one social backend;

creating a new instance of a social object within said social backend by said integration component;

inserting new social object identification into meta data of said newly created social object; and representing said newly created social object as a portal object to a portal user, wherein said representing reflects deletion and updates of portal objects in said at least one social backend.

19. The computer program product of claim 18, wherein a folder of said at least one social backend is associated to a page on said portal, wherein a file of said at least one social backend is associated to a portlet on said portal, and wherein a forum topic of said at least one social backend is associated to a web content on said portal.

\* \* \* \* \*